(12) United States Patent
Viviani

(10) Patent No.: US 9,953,239 B2
(45) Date of Patent: Apr. 24, 2018

(54) ATOMATIC MONITORING SYSTEMS

(71) Applicant: Gary L Viviani, Lyle, WA (US)

(72) Inventor: Gary L Viviani, Lyle, WA (US)

( * ) Notice: Subject to any disclaimer, the term of this patent is extended or adjusted under 35 U.S.C. 154(b) by 337 days.

(21) Appl. No.: 15/002,825

(22) Filed: Jan. 21, 2016

(65) Prior Publication Data

US 2016/0140818 A1    May 19, 2016

(51) Int. Cl.
*G06K 9/62* (2006.01)
*H04N 7/18* (2006.01)
*G08B 21/02* (2006.01)
*G08B 29/18* (2006.01)
*G08B 13/196* (2006.01)

(52) U.S. Cl.
CPC ............ *G06K 9/6202* (2013.01); *G08B 21/02* (2013.01); *G08B 29/188* (2013.01); *H04N 7/181* (2013.01); *H04N 7/188* (2013.01); *G08B 13/19613* (2013.01)

(58) Field of Classification Search
CPC .................................................. G06K 9/6202
USPC ........................................................ 348/143
See application file for complete search history.

(56) References Cited

U.S. PATENT DOCUMENTS

| 2008/0170120 A1* | 7/2008 | Senior | H04N 7/183 348/143 |
| 2013/0329052 A1* | 12/2013 | Chew | H04N 7/181 348/159 |

* cited by examiner

*Primary Examiner* — Yulin Sun
(74) *Attorney, Agent, or Firm* — Mohr Intellectual Property Law Solutions, P.C.

(57) ABSTRACT

A method of monitoring a space for armed and dangerous individuals comprises obtaining a series of digital images of the space via a first digital camera; detecting a series of ambient noise levels of the space via an electronic noise detecting device; processing the series of images; processing the series of ambient noise levels; checking for an armed and dangerous individual; and triggering an alarm signal. Processing the series of images may include comparing objects in a first image of the series of images to at least one predetermined weapon patterns; and comparing objects in the first image of the series of images to at least one predetermined human patterns. Processing the series of ambient noise levels may include determining an upper threshold noise level based on the series of ambient noise levels; and comparing a first ambient noise level to the upper threshold noise level.

15 Claims, 2 Drawing Sheets

ATOMATIC MONITORING SYSTEMS

BACKGROUND

The present disclosure relates generally to monitoring systems. In particular, automatic visual and auditory monitoring systems are described.

Known monitoring systems are not entirely satisfactory for the range of applications in which they are employed. For example, existing monitoring systems are not capable of discerning between armed and unarmed individuals. In addition, conventional monitoring systems typically rely on only a single stream of data.

Thus, there exists a need for monitoring systems that improve upon and advance the design of known monitoring systems. Examples of new and useful monitoring systems relevant to the needs existing in the field are discussed below.

SUMMARY

In one embodiment, a method of monitoring a space for armed and dangerous individuals includes the steps of obtaining a series of digital images of the space via a first digital camera; detecting a series of ambient noise levels of the space via an electronic noise detecting device; and processing the series of images. The image processing may include: (i) comparing objects in a first image of the series of images to at least one predetermined weapon patterns; and (ii) comparing objects in the first image of the series of images to at least one predetermined human patterns. The method may further include processing the series of ambient noise levels, wherein the processing comprises: (i) determining an upper threshold noise level based on the series of ambient noise levels; and (ii) comparing a first ambient noise level to the upper threshold noise level. The method may also include checking for an armed and dangerous individual, wherein the checking comprises: (i) when a first object in the first image is matched to one of the predetermined weapon patterns, then activating a first alarm criterion; (ii) when a second object in the first image is matched to one of the predetermined human patterns, then activating a second alarm criterion; (iii) when the first ambient noise level exceeds the upper threshold noise level, then activating a third alarm criterion. The method may include triggering an alarm signal, only when all of the first, second and third alarm criteria are simultaneously activated.

In one embodiment, the step of determining an upper threshold noise level comprises calculating a standard deviation of the series of ambient noise levels; and calculating a mean of the series of ambient noise levels. In one example, the upper threshold noise level is at least the mean plus three times the standard deviation.

In one embodiment, the step of processing the series of ambient noise levels comprises determining a lower threshold noise level based on the series of ambient noise levels; and comparing the first ambient noise level to the lower threshold noise level. In one embodiment, the checking step comprises: when the first ambient noise level is less than the lower threshold noise level, then activating a fourth alarm criterion. In one embodiment, an alarm signal is triggered only when all of the first, second, and fourth criteria are simultaneously activated.

In one embodiment, the step of determining a lower threshold noise level comprises: calculating a standard deviation of the series of ambient noise levels; and calculating a mean of the series of ambient noise levels. In one example, the lower threshold noise level is not greater than the mean minus three times the standard deviation. In some embodiments, when the first and second alarm criteria are activated, then the step of processing the series of images comprises: determining a proximity between the first object and the second object; and comparing the proximity to a predetermined threshold distance. In some embodiments, when the proximity is less than the threshold distance, then a fifth alarm criterion is activated. In some embodiments, an alarm signal is triggered only when all of the first, second, third and fifth criteria are simultaneously activated.

In one embodiment, the series of digital images is a first series. In this embodiment, the method may further comprise: obtaining a second series of digital images of the space via a second digital camera; and processing the second series of digital images.

In some embodiments, an audible alarm may be sounded in response to the triggering step. In some embodiments, the first image may be stored in response to the triggering step. In some embodiments, the method may comprise digitally transmitting the first image in response to the triggering step.

DETAILED DESCRIPTION

The disclosed monitoring systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various monitoring systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
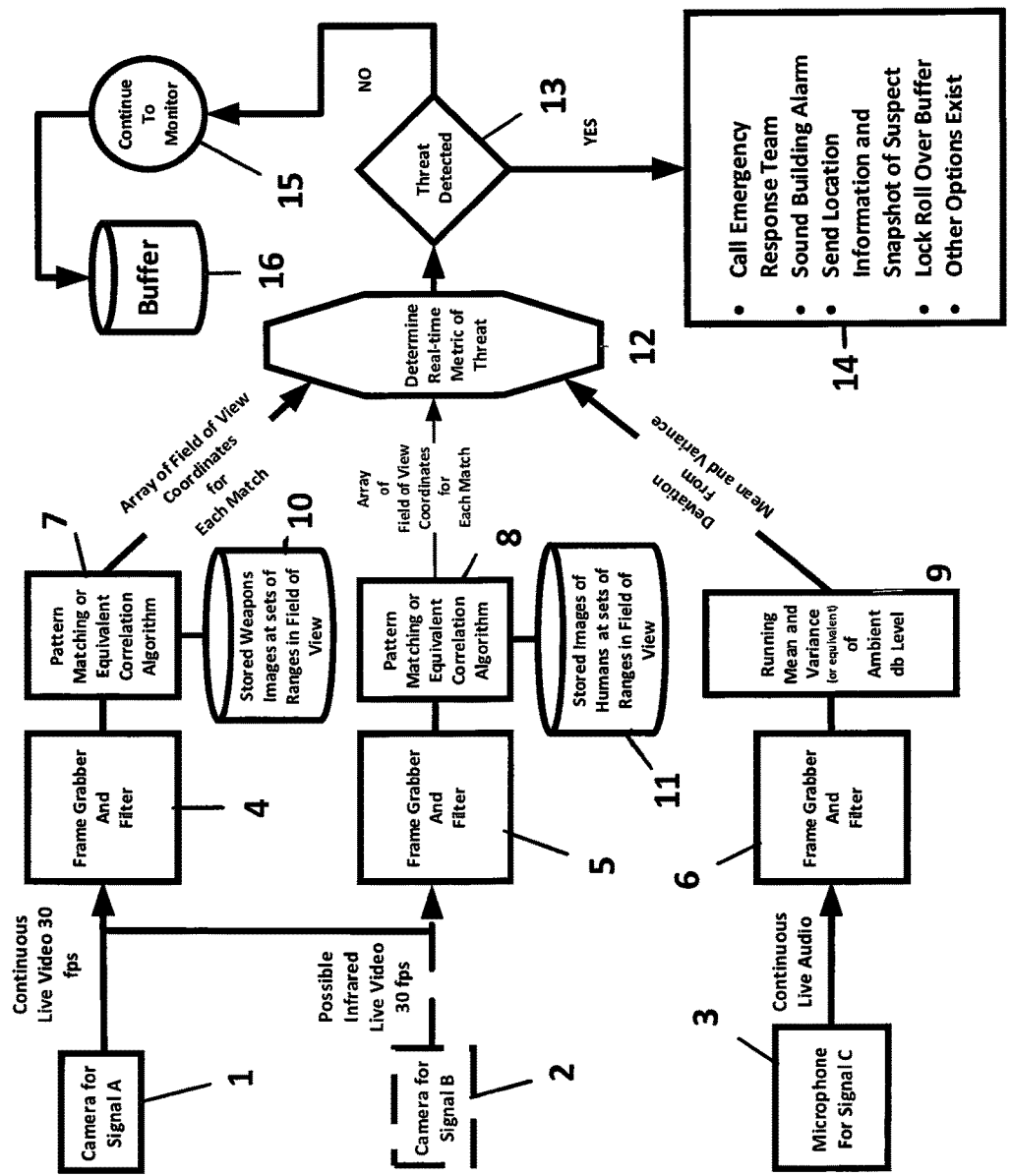
FIG. 1 is a schematic illustration of a first embodiment of an automatic monitoring system.

FIG. 1 shows one embodiment of a monitoring system. The monitoring system of FIG. 1, includes Camera A [1], Camera B [2], and Microphone C [3]. Camera A [1], Camera B [2], and Microphone C [3] function to acquire real-time continuous signals which comprise the set of available sensory inputs. In the illustrated embodiment, Camera A [1] and Camera B [2] may be digital cameras. Furthermore, Microphone C [3] may be an electronic noise detecting device. Camera B [2] is an optional component. Thus, in some embodiments, the monitoring system may comprise a single digital camera.

In the illustrated embodiment, Camera B [2] operates on an different wavelength of incoming radiation, as compared with Camera A [1]. Hence, Camera B[2] provides a statistically independent continuous stream of observations. Thus, Camera B[2] may improve overall performance.

In the illustrated embodiment, Camera A [1], and Camera B [2] each have a radiation gathering lens that focuses an image on an electronic rectangular array of pixels that are electrically sensitivity to particular wavelengths of radiation, within a specific band of operation. Additionally, each camera may comprise a shutter, or equivalent, that operates in conjunction with The Frame Grabber with Filter A [4] and The Frame Grabber with Filter B [5] for Camera A [1], and Camera B [2], respectively. The net effect of these two devices is to provide sampled planar arrays of digital information corresponding to frames of streaming video. A typical frame rate for streaming video, that is chosen in order provide the human with an allusion of continuous operation, is 30 frames per second (fps). Operation at this rate is consistent with what is considered to be equivalent to human abilities of perception and recognition within the field of view. In other embodiments, the cameras may be operated at any other suitable frame rate.

In the illustrated embodiment, Camera A [1], Camera B [2] (if present) and Microphone C [3] are may be stationary and directed approximately to the same distant point that is the center for the coincident fields of view for the camera(s). In other embodiments, the cameras may be mounted in a manner such that they swivel based on motor control, in order to pan across a larger field of view. In still other embodiments, the same sort of functionality could be achieved by electronically controlling an array of cameras in much the same way that phased array antennas and radars operate.

Pursuant to the intents of the objective of this invention, the fields of view of Camera A [1], and Camera B [2] may be coincident and calibrated. Thus, each pixel may correspond to a known physical dimension at the center of the field of view, for a specified range. Accordingly, Camera A [1], and Camera B [2] may be calibrated for their particular use case. That is, the intended use is to be a positioned so as to stare over a fixed and bounded space, such as a classroom, or similar volume within a larger facility. Hence, the dimensions of the space may be known in advance and associated parameters may be utilized in order to be able to determine the size of an object in the field of view, without the need for active ranging. Said differently, the general nature of the calculations may be independent of a particular environment, however there may be calibration constants associated with the volume under surveillance that is use case dependent.

In other embodiments, the camera(s) may comprise a self-calibration system. For example, the camera(s) may include an active range sensor in order to automatically determine the volume under surveillance dimensions.

Still referring to the system of FIG. 1, Camera A [1], Camera B [2] and Microphone C [3] transfer electronically a plurality of signals to The Frame Grabber with Filter A [4], The Frame Grabber with Filter B [5] and The Frame Grabber with Filter C [6], which collectively operate in a synchronous manner. In the illustrated embodiment, Camera B [2] provides signals to The Frame Grabber with Filter B [5]. In other embodiments, the signal from Camera A [1] may be dually provided to both The Frame Grabber with Filter A [4] and The Frame Grabber with Filter B [5]. Thus, a series of digital images comprising consecutive frames of arrays of pixels is obtained. By electronically producing such consecutive frames, so-called full motion video is generated in a manner that is consistent with a motion picture.

In a similar manner, as shown in FIG. 1, The Frame Grabber with Filter C [6] provides similar framing of one dimensional arrays of the data from Microphone C [3]. Thus, a series of ambient noise levels of the space is detected. In the case of The Frame Grabber with Filter A [4] and The Frame Grabber with Filter B [5] the frames (arrays) are two dimensional and in the case of The Frame Grabber with Filter C [6], the frames (arrays) are one dimensional. In all cases the dimensions of the associated arrays have a prescribed and fixed dimensionality and periodicity. The frame rates may be identical (even though the dimensionality may differ).

In the arrangement in FIG. 1, and with regard to The Frame Grabber with Filter A [4], The Frame Grabber with Filter B [5] and The Frame Grabber with Filter C [6], there is an function of filtering, as well as producing frames of data. The filtering function may be employed in order to reduce spurious effects in the images and ambient noise level data.

Still referring to the arrangement in FIG. 1, The Frame Grabber with Filter A [4], and The Frame Grabber with Filter B [5] provide two dimensional arrays of data to The Camera A Electronic Pattern Matching Device [7] and The Camera B Electronic Pattern Matching Device [8], respectively. Within The Camera A Electronic Pattern Matching Device [7] and The Camera B Electronic Pattern Matching Device [8], these arrays can be thought of as buffers of data in fixed memory locations. Additionally, the electronic structure for The Camera A Electronic Pattern Matching Device [7] and The Camera B Electronic Pattern Matching Device [8] may support digital computations for image processing of a particular type, on a frame by frame basis, in a frame synchronous manner across both image inputs and sound input. (Sound inputs are provided by Microphone C [3].)

The nature of the computations, which are described in the next paragraph, may rely on stored images that are calibrated to the field of view. These calibrations will vary depending upon how the center of each camera's field of view is positioned, which in turn will depend upon the dimensions of the volume of the space under surveillance. In the case of The Camera A Electronic Pattern Matching Device [7] there may be an associated set of stored patterns contained in dedicated memory locations associated with The Stored Library of Correlation Objects for Camera A [10]. Within The Stored Library of Correlation Objects for Camera A [10] there may be representation of a plurality of weapons, such a pistols, rifles and knives.

Within the proposed tolerances of the cameras, the dimensions of typical weapons may be precisely known and thus predetermined. Since calibrated images will be available, the library of weapons images may be adjusted in advance of a particular application such that the pixel density and associated dimensionality of the stored images corresponds to the dimensionality of the images that are produced. By making the stored images consistent with the known dimensions of the space and the associated focal point of the cameras, the calculations which follow may be simplified.

Moreover, depending upon the depth of an object, under surveillance, within the camera field of view, and assuming that no active range finding device is employed, the apparent size of an object may vary, depending upon its distance from the camera. In one embodiment, the monitoring systems may employ an active range sensor such that when a particular object is identified in the field of view, a directed active sensor would determine its range and allow for an indication of its precise dimensions.

An object of this invention is to detect weapons which are easy to characterize in advance. A multi-pass calculation may evaluate a particular image frame by checking for multiple scaled images of the same object. For example, an electronically stored image pattern of a particular weapon, such as a pistol, may be calibrated to be associated with a distance that may correspond to the center of the space under surveillance. Such a weapon may be represented as, for example, 3 virtual weapons. The original image plus an image representing the same weapon at a closer distance from the camera as well as third variation of the same weapon that representing it at a farther distance from the camera. In this manner, in order to find a particular weapon, the image processing algorithm may compare objects in a first digital image of the space under surveillance to the three variations of the pistol pattern. Thus, range variations may be taken into account.

In other embodiments, a set of patterns for a particular weapon may comprise only a single image pattern. In still other embodiments, the set of patterns for a particular weapon may comprise two image patterns. In still other embodiments, the set of patterns for a particular weapon may comprise four or more image patterns.

In one embodiment, comparing objects in a digital image of the space under surveillance may comprise cross-correlation described by the following mathematical operations.

For continuous functions "f" and "g", the cross-correlation is defined as:

$$(f*g)(\tau) \stackrel{def}{=} \int_{-\infty}^{\infty} f^*(t)g(t+\tau)dt, \qquad (2)$$

where f* denotes the complex conjugate of f and τ is the time lag.

Similarly, for discrete functions, the cross-correlation is defined as:

$$(f \star g)[n] \stackrel{def}{=} \sum_{m=-\infty}^{\infty} f^*[m]g[m+n]. \qquad (3)$$

By applying Fourier Transform Operators, it is well known that the convolution operation is transformed into an multiplication operation in the dual domain of signal analysis. In the case of (3), the digital Fast Fourier Transform (FFT) algorithm can be effectively applied in order to determine cross-correlation related calculations (in the frequency domain). Still referring to (3), if f is associated with an element from the libraries of either The Stored Library of Correlation Objects for Camera A [10] or The Stored Library of Correlation Objects for Camera B [11], a two dimension cross-correlation calculation can be performed where the image denoted as g may contain an object represented by f. (For simplicity (2) and (3) represent one dimensional integrals. The extension to "n" dimensions is well known.)

When a numerical two-dimensional cross-correlation calculation is performed on a particular frame, a "match," which indicates a correspondence (similarity) between f and g, will be indicated by a peak in the two dimensional resultant image. If there is no correspondence, there will be no prominent peaks. By such a methodology, and variants to this, the determination of existence for a particular object of interest in the image field of view is made. In some embodiments, pattern matching may provide a real-time (e.g., less than a second) response. In other embodiments, other methods of pattern matching may be employed.

Still referring to the arrangement in FIG. 1, Microphone C [3], and The Frame Grabber with Filter C [6] provide a one dimensional array of data to The Running Statistical Mean and Variance Calculation [9]. Instead of pattern matching, as in the case of The Camera A Electronic Pattern Matching Device [7] and The Camera B Electronic Pattern Matching Device [8], The Running Statistical Mean and Variance Calculation [9] performs a calculation that keeps track of the running mean and variance of the buffered one dimensional arrays that are provided in a frame synchronous manner. All calculations may be completed within the period allotted to a single frame. Unlike the case of The Camera A Electronic Pattern Matching Device [7] and The Camera B Electronic Pattern Matching Device [8], The Running Statistical Mean and Variance Calculation [9] does not rely on the store of images for correlation purposes. The output of The Running Statistical Mean and Variance Calculation [9] is a stream and mean and variance determinations on a frame by frame basis. This continuous stream of data are provided to The Calculation Engine [12].

The function of The Running Statistical Mean and Variance Calculation [9] is to provide a real-time (e.g., less than a second) effective statistical discriminator based on a continuous stochastic process (signal). In other embodiments, other statistical discriminators, besides mean and variance, may be employed.

In the embodiment of FIG. 1, both The Camera A Electronic Pattern Matching Device [7] and The Camera B Electronic Pattern Matching Device [8] may perform cross-correlation on a frame by frame basis, e.g., continuously. In the case of The Camera A Electronic Pattern Matching Device [7], it is "looking" for weapons in the field of view, based stored images in The Stored Library of Correlation Objects for Camera A [10]. It is important to note that the processing required is proportional to the number and type of weapons it must search for. For example, if it were to only search for handguns, this would take less processing power than if it were to search for handguns, rifles and knives. If it finds a match, which is a rare event, it will output the location within the field of view where the "match" was spotted and provide this to The Calculation Engine [12]. Similarly, in the case of The Camera B Electronic Pattern Matching Device [8], it will be searching for "matches" for humans in the field of view. This can be done by relying solely on Camera A [1] inputs to The Frame Grabber with Filter B [5], or else it can rely on optional Camera B [2] inputs to The Frame Grabber with Filter B [5].

In one embodiment, Camera B [2] may be an infrared wavelength sensor, whereby humans may be recognized via a heat signature. In other embodiments, humans may be recognized by relying on Camera A [1] inputs into The Frame Grabber with Filter B [5]. In this regard, The Frame Grabber with Filter B [5] will be "searching" for locations of humans in the field of view. As compared to the output of The Frame Grabber with Filter A [4], The Frame Grabber with Filter B [5] will have a continuous stream of human "matches" at various locations within the field of view, since the intended application is in situations that may involve many people in the field of view. This stream of locations of people will be passed to The Calculation Engine [12] on a continuous and synchronized frame by frame basis.

A further object of this invention is straightforward determination of the existence of a threatening situation involving a weapon. As shown in FIG. 1, continuous streams of processed data from The Camera A Electronic Pattern Matching Device [7], The Camera B Electronic Pattern Matching Device [8] and The Running Statistical Mean and Variance Calculation [9] are provided to The Calculation Engine [12]. The monitoring system may detect a threatening situation involving a weapon as described below.

The Calculation Engine [12] may determine if there are any weapons in the field of view, based on the output of The Camera A Electronic Pattern Matching Device [7] on a continuous frame by frame basis as described above. If one or more weapons are detected, a first alarm criterion may be activated. In one embodiment, if no weapon is present, no further processing is necessary.

In one embodiment, the Calculation Engine [12] may determine if there are any humans in the field of view, based on the output of The Camera A Electronic Pattern Matching Device [7] on a continuous frame by frame basis, or based on an infrared signature, as described above. If one or more humans are detected, a second alarm criterion may be activated.

The Calculation Engine [12] may process the ambient noise levels. For example, in one embodiment, The Calculation Engine [12] may take into account the statistical variation of The Running Statistical Mean and Variance Calculation [9], which may be a second order statistical discriminating device. The second order statistics of any statistical process may tend to be very revealing. As stochastic processes represent the world around us, stationary processes have relatively constant mean and variance. If The Running Statistical Mean and Variance Calculation [9] indicates a sudden change in the mean and variance, as compared to the previous running average, this would correspond to a sudden "hush," or else a sudden "cry of alarm" within the group of individuals in the space under surveillance. Thus, upper and/or lower threshold noise levels may be determined as a function of a running calculation of the mean and variance of the series of ambient noise levels detected by the Microphone [3]. In some embodiments, when the ambient noise level exceeds the upper threshold noise level, then a third alarm criterion is activated. In some embodiments, when the ambient noise level falls below the lower threshold noise level, then a fourth alarm criterion is activated.

The threshold noise levels may be adjusted in order to control the sensitivity of the detection of hush or cry of alarm. For example, if the mean and or variance incurs a change that is at least 3 standard deviations from the mean (variance), the probability that the associated stochastic process has "changed" is very high.

As can be imagined by the reader, this sort of situation can occur under normal circumstances, such as when someone is telling a joke, for example. However, if this situation occurs simultaneously with the detected presence of a weapon in the room, this is deemed to be an imminent threat and The Calculation Engine [12] would indicate that The Threat Level Comparator [13] should indicate that an alarm condition has resulted. Thus, in some embodiments, an alarm is triggered only when all of the first, second and third alarm criteria are simultaneously activated. Similarly, in some embodiments, an alarm is triggered only when all of the first, second and fourth alarm criteria are simultaneously activated. This will initiate further actions, as will be described below. Additionally, the filtering operations within The Frame Grabber with Filter C [6] and associated computations of The Running Statistical Mean and Variance Calculation [9] will allow for the possibility of immediately detecting the fact that a firearm has been discharged in the space under surveillance. Regardless of a positive detection by The Camera A Electronic Pattern Matching Device [7], this event will also initiate alarm conditions, as will be described.

In one embodiment, when The Camera A Electronic Pattern Matching Device [7] indicates one or more weapons are present (i.e., when the first alarm criterion is activated), the location of the weapon(s) may be compared to the locations of any humans in the field of view. If the location of a weapon is physically close to one or more of the humans in the field of view, then a fifth alarm criterion may be activated. In some embodiments, when the fifth alarm criterion is activated, then a threat has been detected.

It is noted that extension to basic pattern matching can be made to assure that a threat involves recognizing that a weapon is in the extended hand of a human, or else in close proximity to a chest region or else a head region. These refinements will require more processing power and cost, and these costs and complexity may not be warranted. Accordingly, the libraries of stored images in The Stored Library of Correlation Objects for Camera A [10] and The Stored Library of Correlation Objects for Camera B [11] may also be modified accordingly.

Still referring to FIG. 1, the output of The Calculation Engine [12] will be what determines the output of The Threat Level Comparator [13]. Under routine conditions, The Threat Level Comparator [13] will indicate that there is no threat present. As such, The Monitoring Device Switch [15] causes The Rollover Buffer [16] to continually record, in a looping manner, the outputs of Camera A [1], Camera B [2], Microphone C [3], as well as The Camera A Electronic Pattern Matching Device [7], The Camera B Electronic Pattern Matching Device [8], The Running Statistical Mean and Variance Calculation [9] as well as The Calculation Engine [12]. The terms roll-over, or else "looping," are synonymous and indicate that the buffer will be of finite length. As an example, it may include the last twenty minutes, or otherwise determined fixed time interval, of observations. After the recoding length is exceeded, the oldest elements are overwritten in memory. Hence, at anytime, only (for example) twenty minutes of recordings are maintained, and they are continuously being overwritten, under routine circumstances.

Also indicated by FIG. 1 is the circumstance that The Threat Level Comparator [13] will indicate that a threat is present and this will initiate the actions indicated by The Threat Response Component [14]. These actions include, but are not limited to:

1. Sending a message either by hardwired interconnect, wireless radio, and/or telephone to summon first responders. Thus the monitoring system may include an appropriate transmitter module, whether it be a signal sent over a hardwire, or else a protocol sent to another receiver, the Internet, and/or a routine cellphone like telephone call, will rely on the standard electronics for accomplishing these activities. The processing unit, labeled as The Calculation Engine [12] will provide necessary situational awareness data to The Threat Response Component [14], which will be utilized in the transmission.

2. Additionally, the object of this invention may, or may not be coupled to the building fire alarm system, and/or an alternative building alarm. In the event of a threat detection, The Threat Response Component [14] sends an electronic signal to sound the appropriate building alarm. In this respect, the interface to the alarm system may be hardwired, wireless or else telephonic in nature. Thus, in some embodiments, the monitoring system includes the appropriate modules in order to transmit the messages as appropriate.

3. In some embodiments, The Threat Response Component [14] culls through the data in The Rollover Buffer [16] and provides a still frame (snapshot) of the indicated detection, along with pertinent location information, in all transmitted messages to responders.

4. The Threat Response Component [14] may send a signal to The Monitoring Device Switch [15] to cease overwriting operations for The Rollover Buffer [16]. This will assure that the sequence of electronically recorded events will be available for later review.

An object of this invention is to include a means for responding to the threat, the descriptions above should not be considered as comprehensive in nature. In other embodiments, The Threat Response Component [14] may be configured to trigger other sorts of responses, including active means to subdue an individual with malice intent. For example, The Threat Response Component [14] may activate intense sound vibrations which would incapacitate all individuals in the surveillance area, but not in a manner that would cause permanent injury. Alternatively, The Threat Response Component [14] may activate tear gas or other sorts of vapor that would temporarily incapacitate individuals without inflicted permanent injury. Other sorts of passive responses are also within the scope of this invention.

Figure 2:
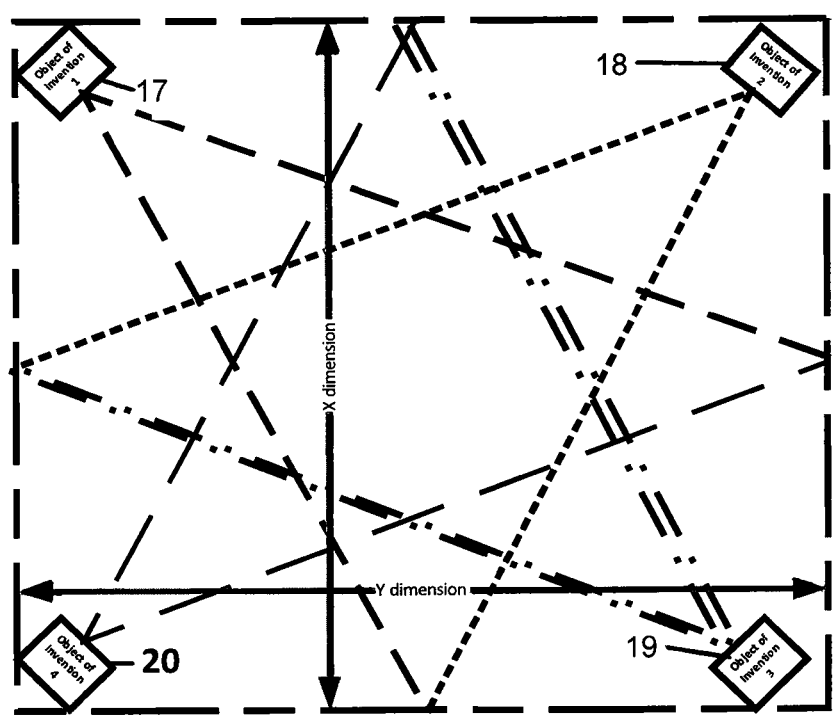
FIG. 2 is a schematic illustration of a second embodiment of an automatic monitoring system.

Turning now to FIG. 2, a second embodiment of a monitoring system will now be described. In particular, if only a single object of this invention as detailed in FIG. 1 is peering and monitoring the activities within a bounded volume, it is possible that a weapon may not be visible within the field of view of either Camera A [1] or Camera B [2]. This circumstance may be avoided by having multiple identical objects of this invention described by FIG. 1 in the same space under surveillance. This situation is described by FIG. 2.

As indicated in FIG. 2, there are multiple objects of this invention involved. These are shown as: Object of Invention A [17], Object of Invention B [18], Object of Invention C [19], and Object of Invention C [19]. In FIG. 2, nominal fields of view for Object of Invention A [17], Object of Invention B [18], Object of Invention C [19], and Object of Invention C [19] are also indicated. The arrangement shown is a representative possibility and not a limiting one. For example, more or less objects of this invention could be employed and they could also have a different arrangement for their associated fields of view. Additionally, the shape of the space under surveillance in question may not be rectangular in nature. What FIG. 2 is indicating is the fact that multiple identical objects of invention will be deployed in a manner that makes it unlikely that a weapon can be hidden from the field of view of at least one camera. At least one object of this invention should have clear view of the existence of a weapon under all situations, continuously. All that has been described and presented regarding FIG. 1 pertains to each of the objects of invention that are applied to a particular space under surveillance as indicated by FIG. 2. Hence, a further object of this invention is summarized by FIG. 2, whereby relatively simple and low cost devices can be combined in a manner that avoids shortcomings of only a single device. Moreover, another object of this invention is to assure that the system described by FIG. 2 is not easy to disable. The fact that there are redundant devices makes it less likely that the system will be rendered ineffective.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method of monitoring a space for armed and dangerous individuals, the method comprising:
   (a) obtaining a series of digital images of the space via a first digital camera;
   (b) detecting a series of ambient noise levels of the space via an electronic noise detecting device;
   (c) processing the series of images, wherein the processing comprises:
      (i) comparing objects in a first image of the series of images to at least one predetermined weapon patterns; and
      (ii) comparing objects in the first image of the series of images to at least one predetermined human patterns;
   (d) processing the series of ambient noise levels, wherein the processing comprises:
      (i) determining an upper threshold noise level based on the series of ambient noise levels;
      (ii) comparing a first ambient noise level to the upper threshold noise level;
   (e) checking for an armed and dangerous individual, wherein the checking comprises:
      (i) when a first object in the first image is matched to one of the predetermined weapon patterns, then activating a first alarm criterion;
      (ii) when a second object in the first image is matched to one of the predetermined human patterns, then activating a second alarm criterion;
      (iii) when the first ambient noise level exceeds the upper threshold noise level, then activating a third alarm criterion; and
   (f) triggering an alarm signal, only when all of the first, second and third alarm criteria are simultaneously activated.

2. The method of claim 1, wherein the step of determining an upper threshold noise level comprises:
   calculating a standard deviation of the series of ambient noise levels; and
   calculating a mean of the series of ambient noise levels.

3. The method of claim 1, wherein the upper threshold noise level is at least the mean plus three times the standard deviation.

4. The method of claim 1, wherein the step of (d) processing the series of ambient noise levels comprises:
   determining a lower threshold noise level based on the series of ambient noise levels; and
   comparing the first ambient noise level to the lower threshold noise level.

5. The method of claim 4, wherein the (e) checking step comprises:
   when the first ambient noise level is less than the lower threshold noise level, then activating a fourth alarm criterion.

6. The method of claim 4, comprising triggering an alarm signal, only when all of the first, second, and fourth criteria are simultaneously activated.

7. The method of claim 4, wherein the step of determining a lower threshold noise level comprises:
   calculating a standard deviation of the series of ambient noise levels; and
   calculating a mean of the series of ambient noise levels.

8. The method of claim 7, wherein the lower threshold noise level is not greater than the mean minus three times the standard deviation.

9. The method of claim 1, wherein when the first and second alarm criteria are activated, then the step of processing the series of images comprises:
   determining a proximity between the first object and the second object; and
   comparing the proximity to a predetermined threshold distance.

10. The method of claim 9, wherein the (e) checking step comprises:
    when the proximity is less than the threshold distance, then activating a fifth alarm criterion.

11. The method of claim 10, comprising triggering an alarm signal, only when all of the first, second, third and fifth criteria are simultaneously activated.

12. The method of claim 1, wherein the series of digital images is a first series, the method comprising:
    obtaining a second series of digital images of the space via a second digital camera; and
    processing the second series of digital images.

13. The method of claim 1, comprising:
    sounding an audible alarm in response to the triggering step.

14. The method of claim 1, comprising
    storing the first image in response to the triggering step.

15. The method of claim 14, comprising:
    digitally transmitting the first image in response to the triggering step.

* * * * *

UNITED STATES PATENT AND TRADEMARK OFFICE
CERTIFICATE OF CORRECTION

| | |
|---|---|
| PATENT NO. | : 9,953,239 B2 |
| APPLICATION NO. | : 15/002825 |
| DATED | : April 24, 2018 |
| INVENTOR(S) | : Gary Viviani |

It is certified that error appears in the above-identified patent and that said Letters Patent is hereby corrected as shown below:

On the Title Page

Item (54) and in the Specification Column 1 Line 1 the title should read:
AUTOMATIC MONITORING SYSTEMS.

Signed and Sealed this
Fifth Day of June, 2018

Andrei Iancu
*Director of the United States Patent and Trademark Office*